F. CONLY.
DISPLAY APPARATUS.
APPLICATION FILED AUG. 23, 1909.
1,009,477.
Patented Nov. 21, 1911.
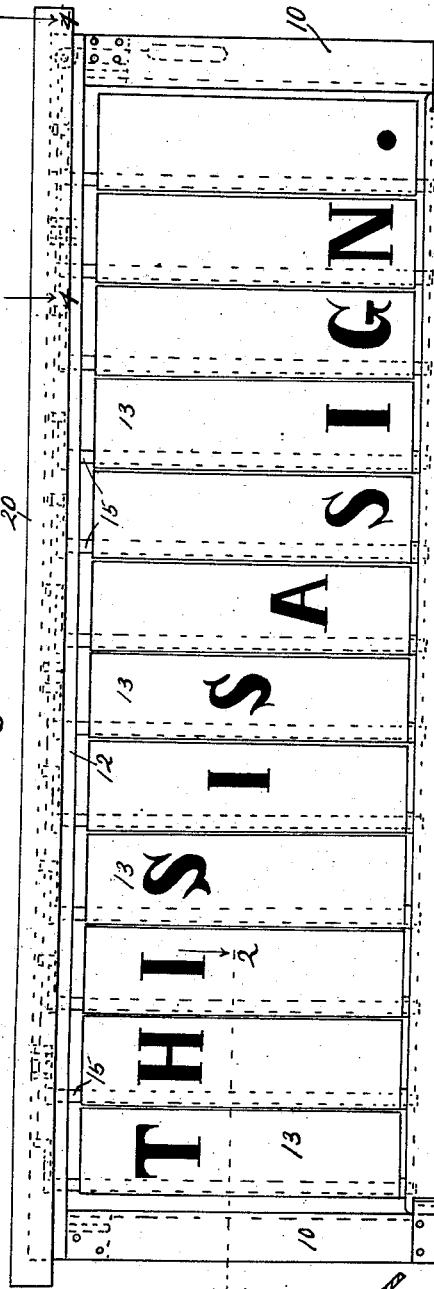
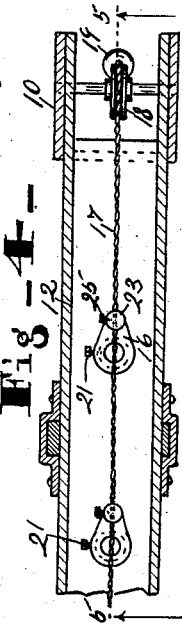
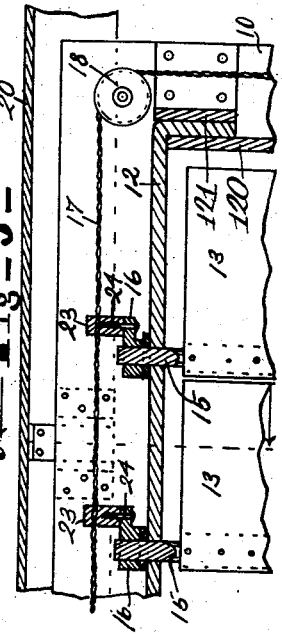
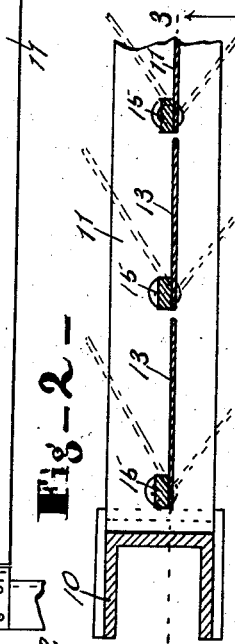
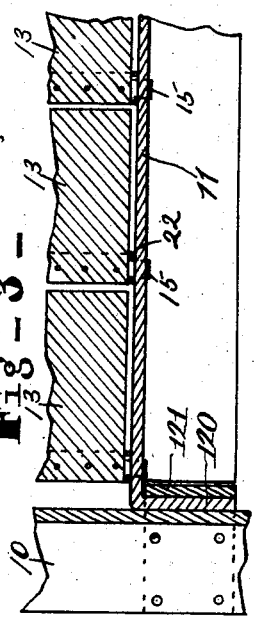
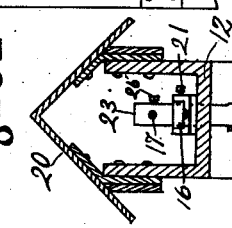
WITNESSES:
INVENTOR.
Frank Conly.
BY
ATTORNEY.

UNITED STATES PATENT OFFICE.

FRANK CONLY, OF INDIANAPOLIS, INDIANA.

DISPLAY APPARATUS.

1,009,477. Specification of Letters Patent. Patented Nov. 21, 1911.

Application filed August 23, 1909. Serial No. 514,314.

*To all whom it may concern:*

Be it known that I, FRANK CONLY, of Indianapolis, county of Marion, and State of Indiana, have invented a certain new and useful Display Apparatus; and I do hereby declare that the following is a full, clear, and exact description thereof, reference being had to the accompanying drawings, in which like letters refer to like parts.

The object of this invention is to provide a novel and attractive sign for advertisements and the like.

The chief feature of the invention consists in providing a number of vertically disposed oscillatory plates, preferably hinged or pivoted at the top and bottom, and a single means drawn by a weight, string, or the like, that tends to hold said plates normally in alinement, but the spring or weight is weak enough to permit the wind to blow said plates from one side to the other and keep them oscillating more or less, so as to attract attention, and prevent the device from being blown down by a strong wind, as in such event the wind will turn the plates and pass through between them.

The nature of the invention will be understood from the accompanying drawings and the following description and claims.

In the drawings Figure 1 is a front elevation of the device with the supporting means broken away. Fig. 2 is a horizontal section on the line 2—2 of Fig. 1 showing the normal position of the plates by full lines and the possible other positions by dotted lines. Fig. 3 is a vertical section on the line 3—3 of Fig. 2. Fig. 4 is a horizontal section on the line 4—4 of Fig. 1. Fig. 5 is a vertical section on the line 5—5 of Fig. 4. Fig. 6 is a vertical section on the line 6—6 of Fig. 5.

This sign or advertising device may be mounted upon a building or any other structure, or upon the ground by means of posts 10, the means of mounting same being immaterial to this invention.

The posts 10, as shown in Figs. 1 and 4, are herein formed of channel iron, but they may be formed otherwise. Between the posts 10 there is a lower bar 11 and an upper bar 12 of channel iron, and there is a series of plates 13 vertically disposed and adapted to have advertising thereon, and which are mounted successively in place between said bars 11 and 12, so that they will normally be in alinement with each other. They are pivoted or fulcrumed in the bars 11 and 12 by rods 15 located at a side edge of said plates 13, but the means for pivoting them to the said bars 11 and 12 may be otherwise arranged, so that, however, said plates 13 will be horizontally oscillatory, as indicated in Fig. 3, under the influence of the wind or other means. On the upper end of each pivot rod 15, as seen in Fig. 5, there is a small crank arm 16 secured, to all of which a chain 17 is attached. This chain is fastened at the left-hand end of the device and at the right-hand end runs over a sheave wheel 18 mounted in the side walls of the bar 12 and down through the end post 11, and carries a weight 19 at the end. The device has a roof on it as shown in Fig. 6.

In operation, the wind swings the plates 13 constantly from side to side according to the strength of the wind, and the effect of the weight 19. The latter should not be so heavy as to prevent the vibration of the plates 13 under the influence of a moderate wind. Said weight at all times acting through the chain 17, tends to return the plates to the normal position of alinement.

The pivot rods 15 are preferably square excepting at their upper and lower ends, which are round and adapted to fit in round bearings. The plates 13 are riveted to said rods or otherwise secured. There is enough room left between the upper ends of the plates and the top bar 12 to enable the plates to be lifted so as to lift the lower ends of the pivot rods out of their bearings, or sockets, and in that way the plate and its pivot rod can be removed after releasing the set screw 21 which holds the crank 16 on the upper end of the rod. The washer 22 around the lower part of each pin 15 holds the lower end of the plate 13 off the lower bar 11. The crank 16 is formed of a lower horizontal portion and an upwardly extending portion 23 that has a horizontal hole through it for the cable 17. The lower end of the part 23 is mounted on the pin 24 extending upwardly from the horizontal portion of the crank. That is to enable the part 23 as soon as the cable moves to oscillate horizontally on the horizontal portion of the crank and thus make the parts work easily. This avoids any kink in the cable. The cable is clamped in the crank by screw 25.

With an advertising device of the kind described the sign can be placed on both sides thereof and the apparatus set at a right angle to the highway or railway, so that as one passes they see first one side and then the other, and the sign will read properly whether the plates are in alinement or the wind has blown them at an angle.

To render the advertising device convenient to construct, ship or transport and to be erected by anybody, the bars 11 and 12 have turned down ends 120 adapted to slip in vertical sockets in the brackets 121 on the vertical frame bars or posts 10. This enables the device to be shipped or transported in knock-down condition and be set up by anybody quickly. Thus the posts 10 are made and shipped with the brackets 121 secured thereon. In sending it to the place of direction, the top bar 12 is put in place and then the sign plates inserted into it and the lower bar 11 and then the combination of the two bars 11 and 12 and the sign plates push up far enough to let the turned down ends of the plate 11 sink into the socket and when that happens the top bar 12 will sink completely down into its socket, as shown in Fig. 5, and the sign plates 13 will assume the position shown in Fig. 5. The combination of the bars 11 and 12 and plates 13 can, as a whole, be lifted up and out of the frame formed of the posts 10 and top 20, whenever that may be desired.

What I claim as my invention and desire to secure by Letters Patent is:

1. An advertising device including a frame, a series of vertical sign plates pivotally mounted at their upper and lower ends and near one edge of each plate so that the plates may be in alinement with each other and free to swing laterally on their pivots, and yielding means acting on all of said plates and tending to return and maintain them in alinement with each other, whereby said plates may be swung by the wind and returned to normal position by said yielding means.

2. An advertising device including a frame, vertically disposed plates arranged side by side in alinement with each other, means for pivotally mounting the upper and lower ends of said plates in said frame, a crank in connection with said pivoting means for each plate, a cable connected with all of said cranks, a pulley over which one end of said cable extends, and a weight attached to said end of the cable, substantially as set forth.

3. An advertising device including a frame having a pair of vertical posts, a pair of sockets secured to each post and spaced apart, upper and lower bars with downwardly turned ends adapted to enter said sockets, vertically disposed sign plates pivoted on said bars side by side in alinement with each other and provided with vertical pivots at each end near one edge of the plates, the upper pivot being longer than the lower pivot, and said pivots and plates arranged so that when in place the upper ends of the sign plates will be spaced from the upper bar, and yielding means tending to return and maintain said sign plates in alinement with each other.

In witness whereof, I have hereunto affixed my signature in the presence of the witnesses herein named.

FRANK CONLY.

Witnesses:
G. H. BOINK,
W. M. GENTLE.

---

Copies of this patent may be obtained for five cents each, by addressing the "Commissioner of Patents, Washington, D. C."